(12) United States Patent
Delphia

(10) Patent No.: US 7,537,263 B2
(45) Date of Patent: May 26, 2009

(54) VISOR ASSEMBLY FOR A VEHICLE

(76) Inventor: John B. Delphia, 723 Tournament Cir., Muskegon, MI (US) 49444

( * ) Notice: Subject to any disclaimer, the term of this patent is extended or adjusted under 35 U.S.C. 154(b) by 0 days.

(21) Appl. No.: 11/873,994

(22) Filed: Oct. 17, 2007

(65) Prior Publication Data

US 2008/0088150 A1 Apr. 17, 2008

Related U.S. Application Data

(60) Provisional application No. 60/852,230, filed on Oct. 17, 2006.

(51) Int. Cl.
*B60J 1/02* (2006.01)
(52) U.S. Cl. .................. 296/97.9; 296/97.1; 296/97.11
(58) Field of Classification Search ............... 296/97.1, 296/97.9, 97.11
See application file for complete search history.

(56) References Cited

U.S. PATENT DOCUMENTS

| | | | |
|---|---|---|---|
| 1,275,311 A | 8/1918 | Schumacher et al. | |
| 1,941,032 A * | 12/1933 | Knowles | 296/97.11 |
| 2,462,304 A | 2/1949 | Burdick | |
| 2,583,857 A | 1/1952 | Kooppinger | |
| 2,932,539 A * | 4/1960 | Galbraith | 296/97.11 |
| 2,978,274 A * | 4/1961 | Ordman | 296/97.11 |
| 3,029,103 A | 4/1962 | Horrocks | |
| 3,834,755 A | 9/1974 | Dexter | |
| 3,865,428 A | 2/1975 | Chester | |
| 4,090,733 A | 5/1978 | Altschul | |
| 4,580,829 A | 4/1986 | Matheopoulos | |
| 4,690,450 A | 9/1987 | Boerema et al. | |
| 4,818,013 A | 4/1989 | Van Order | |
| 4,844,530 A | 7/1989 | Mahler et al. | |
| 4,902,063 A | 2/1990 | Crink | |
| 4,998,765 A | 3/1991 | Van Order et al. | |
| 5,040,842 A | 8/1991 | Satore | |
| 5,127,700 A | 7/1992 | Joe et al. | |
| 5,161,850 A | 11/1992 | Redder et al. | |
| 5,261,717 A | 11/1993 | Tsumura et al. | |
| 5,356,192 A | 10/1994 | Schierau | |
| RE35,080 E | 11/1995 | Nenstiel | |
| 5,538,310 A | 7/1996 | Frankhouse et al. | |
| 5,641,191 A | 6/1997 | Jia | |
| 5,851,046 A | 12/1998 | Kalkman et al. | |
| 5,871,252 A | 2/1999 | Gute | |
| 5,921,607 A | 7/1999 | Brooks, II et al. | |

(Continued)

*Primary Examiner*—Lori L Lyjak
(74) *Attorney, Agent, or Firm*—Howard & Howard Attorneys PLLC

(57) ABSTRACT

A visor assembly for a vehicle includes a visor, a beam, an arm, and a carrier. The beam defines a first path. The arm has a first end and a second end spaced from the first end. The arm moveably supports the visor with the visor moveable between the first end and the second end of the arm. The carrier supports the arm at the first end. The carrier also connects the beam and the arm with the second end of the arm laterally spaced from the first path defined by the beam. The carrier is moveable along the first path. The visor assembly enables the visor to be manually continuously adjustable in a substantially horizontal, vertical, and angular manner such that the visor can cover a predetermined area of a windshield or a corresponding side window of a vehicle to shade the eyes of an occupant of the vehicle.

20 Claims, 8 Drawing Sheets

U.S. PATENT DOCUMENTS

| | | |
|---|---|---|
| 5,934,734 A | 8/1999 | Wilson |
| 5,967,587 A | 10/1999 | Collet et al. |
| 5,979,967 A | 11/1999 | Poulson |
| 6,003,928 A * | 12/1999 | Curtindale ................ 296/97.9 |
| 6,007,135 A | 12/1999 | Alves |
| 6,131,986 A | 10/2000 | Rosen |
| 6,174,019 B1 | 1/2001 | Collet et al. |
| 6,176,539 B1 | 1/2001 | Westerman |
| 6,189,947 B1 | 2/2001 | Annan |
| 6,220,644 B1 | 4/2001 | Tiesler et al. |
| 6,328,370 B1 | 12/2001 | Kim |
| 6,402,221 B1 | 6/2002 | Ogunjobi |
| 6,616,209 B1 | 9/2003 | Muyo |
| 6,705,661 B2 | 3/2004 | Amirmoini |
| 7,219,947 B2 | 5/2007 | Takabatake |
| 7,258,470 B2 | 8/2007 | Ogawa |
| 2003/0034665 A1 | 2/2003 | Boyle |
| 2005/0206186 A1 | 9/2005 | Delus et al. |
| 2005/0264021 A1 | 12/2005 | Suzuki et al. |
| 2005/0264022 A1 | 12/2005 | Suzuki et al. |
| 2005/0285427 A1 | 12/2005 | Asai |
| 2006/0125277 A1 | 6/2006 | Maharaj |
| 2007/0164582 A1 | 7/2007 | Ishikura et al. |
| 2007/0210605 A1 | 9/2007 | Solomon |

* cited by examiner

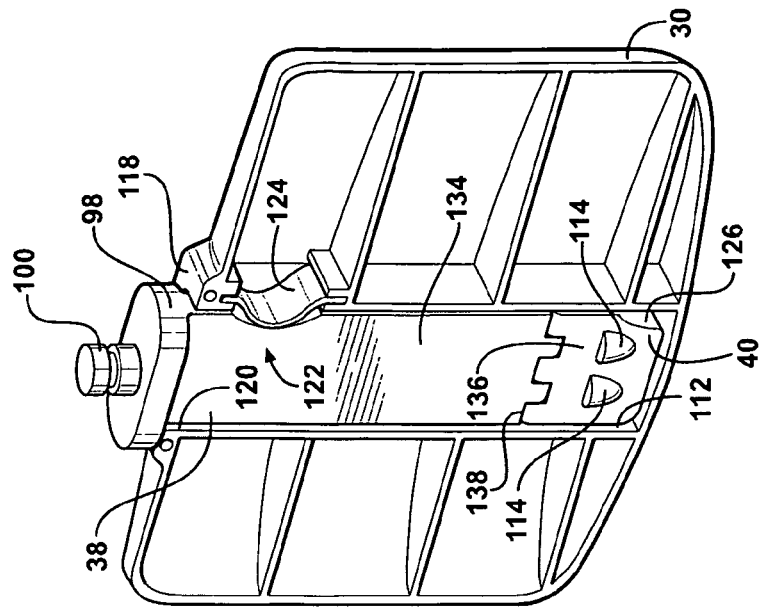
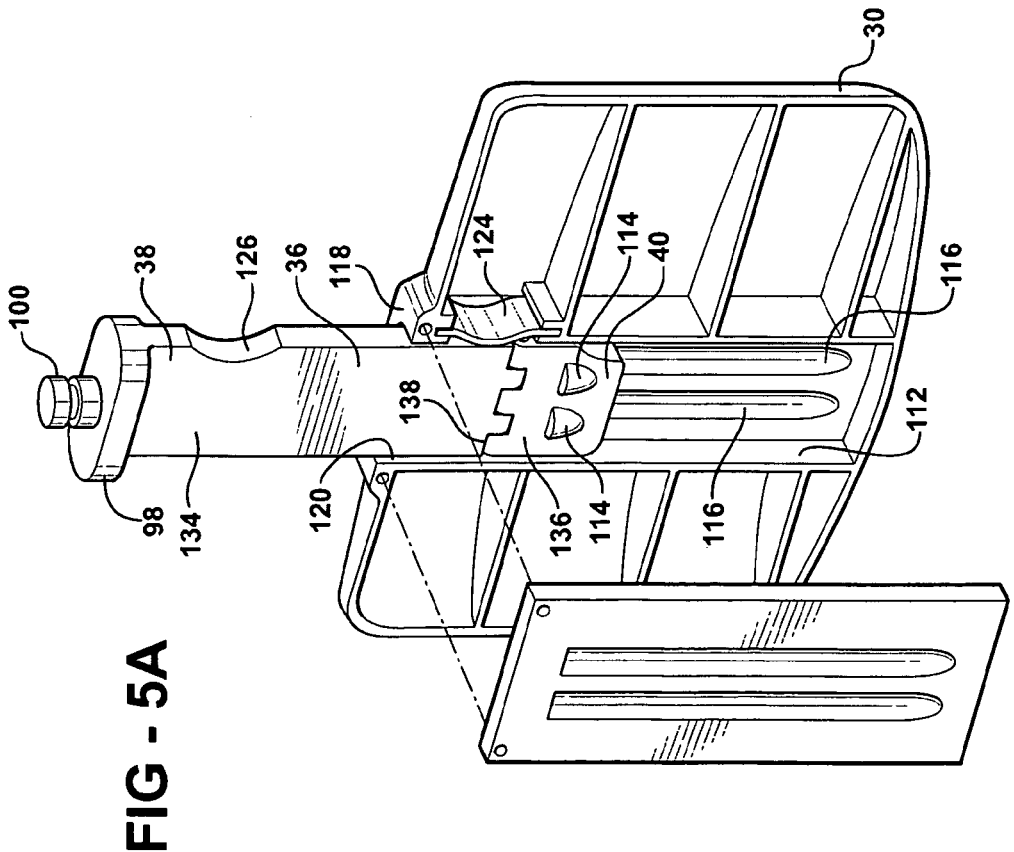

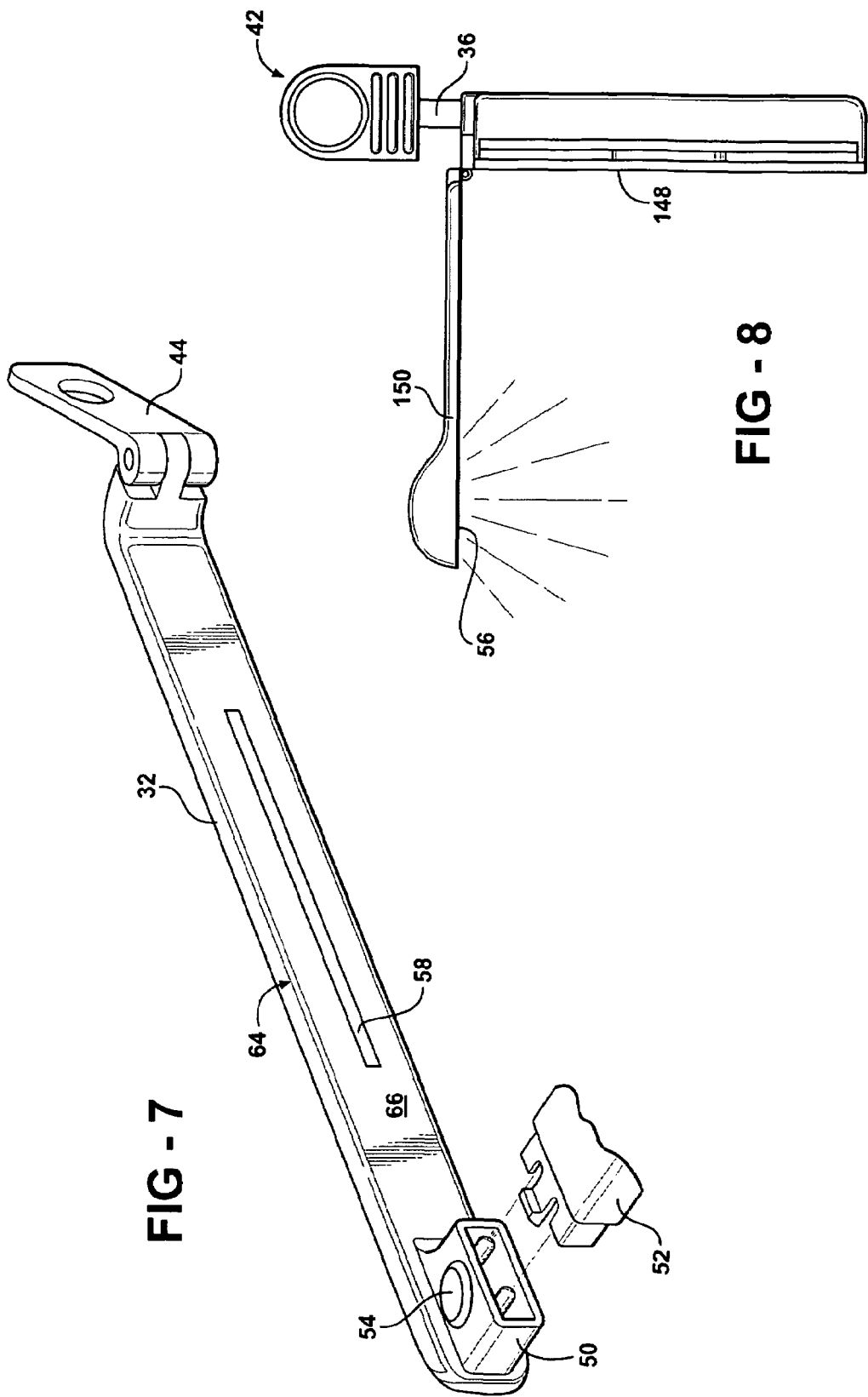

VISOR ASSEMBLY FOR A VEHICLE

RELATED APPLICATIONS

This patent application claims priority to and all advantages of U.S. Provisional Patent Application No. 60/852,230, filed on Oct. 17, 2006.

FIELD OF THE INVENTION

The present invention generally relates to a visor assembly and, more particularly, to a manually adjustable sun-visor assembly for vehicles.

BACKGROUND OF THE INVENTION

A vehicle sun visor generally is fastened above a windshield directly forward from a seat of each of a driver and a front passenger inside a vehicle and adapted to shade the eyes of the respective occupant from light. To this end, the visor includes a main body hingedly fastened to a component of the inside of the vehicle and adapted to be manually moved to shade a predetermined area, including the occupant's eyes, from the light.

One disadvantage of the vehicle sun visors of the related art is that they are relatively large. Another disadvantage of such visors is that, while they may block the sun, they also cause undue impairment or obstruction of vision of the driver and/or passenger of the vehicle around the visor. As such, these visors impair or obstruct peripheral vision of the driver and/or passenger relative to the visor. This impairment or obstruction can be hazardous, especially by blocking or restricting the driver's view of signal lights, traffic, pedestrians, etc. Another disadvantage of such visors is that their articulation is limited. As a result, they cannot be specifically positioned for optimal use of the mirror and blocking of the sun, unwanted headlight glare of an oncoming vehicle, or light glare off another vehicle that the vehicle is following.

Thus, there is a need in the related art for a vehicle sun visor that is relatively small. There is also a need in the related art for such a visor that blocks the sun without causing undue impairment or obstruction of vision of a driver and/or passenger of the vehicle around the visor such that peripheral vision of the driver and/or passenger relative to the visor is not impaired or obstructed. There is also a need in the related art for such a visor that can be maximally articulated such that it can be specifically positioned for optimal use of a mirror and blocking of the sun, unwanted headlight glare of an oncoming vehicle, or light glare off another vehicle that the vehicle is following.

SUMMARY OF THE INVENTION AND ADVANTAGES

The present invention provides a visor assembly for a vehicle. The assembly includes a visor, a beam, an arm, and a carrier. The beam defines a first path. The arm has a first end and a second end spaced from the first end. The arm moveably supports the visor with the visor moveable between the first end and the second end of the arm. The carrier supports the arm at the first end. The carrier also connects the beam and the arm with the second end of the arm laterally spaced from the first path defined by the beam. The carrier is moveable along the first path.

The visor assembly of the present invention overcomes the problems in the related art in visor assemblies for vehicles. The visor assembly of the present invention enables the visor to be manually continuously adjustable in a substantially horizontal, vertical, and angular manner such that the visor can cover a predetermined area of a windshield or a corresponding side window of a vehicle to shade the eyes of an occupant of the vehicle.

Another advantage of the visor assembly of the present invention is that a size of the visor can be minimized due to the freedom of movement afforded by the beam, carrier, and arm. Because the size of the visor can be minimized, the visor can sufficiently block the sun without causing undue impairment or obstruction of vision of the occupant of the vehicle around the assembly.

Another advantage of the visor assembly of the present invention is that the visor can be maximally articulated to block the sun when the sun is low in the horizon or to block the sun for shorter drivers.

Another advantage of the visor assembly of the present invention is that the visor can be specifically positioned for optimal use of an optional vanity mirror and source of light associated therewith while blocking of the sun, unwanted headlight glare of an oncoming vehicle, or light glare off another vehicle that the vehicle is following.

Another advantage of the visor assembly of the present invention is that the visor can be stored out of view.

Another advantage of the visor assembly of the present invention is that the visor can be quickly manually continuously adjusted in an "infinite" number of positions in a substantially horizontal, vertical, and angular manner.

Another advantage of the visor assembly of the present invention is that the effective length of the visor can optionally be extended and increased.

Another advantage of the visor assembly of the present invention is that the assembly is non-handed and can be fitted to either a driver or passenger side of the vehicle without any changes required to be made to the assembly.

Another advantage of the visor assembly of the present invention is that the assembly does not require any unique attachment to the vehicle and can replace existing "rod type" vehicle sun visors with substantially no necessary changes made to the vehicle.

Another advantage of the visor assembly of the present invention is that it can be employed with any suitable type of vehicle, in general, and any suitable type of transportation or construction vehicle, in particular.

Another advantage of the visor assembly of the present invention is that various features thereof can be optionally added, depending upon application of the assembly.

Another advantage of the visor assembly of the present invention is that the assembly essentially allows more area located within the vehicle above the windshield to be employed for use of other overhead functions and displays.

BRIEF DESCRIPTION OF THE DRAWINGS

Other objects, features, and advantages of the present invention will be readily appreciated as the same becomes better understood while reading the subsequent description taken in conjunction with the accompanying drawings wherein:

FIG. 5A is a partially exploded view of the visor and arm of the embodiment of the visor assembly for a vehicle shown in FIG. 1 illustrating connection of these elements relative to each other with a portion of a sleeve in the visor removed;

FIG. 5B is a perspective view of the visor and arm shown in FIG. 5A with the arm in a fully retracted position;

FIG. 7 is a side view of one embodiment of the beam of the visor assembly for a vehicle including a power strip, a clip lock, and a station mechanically connectable to the clip lock; and FIG. 8 is a side view of a position of the visor including a source of light relative to the arm, connector, and beam of FIG. 7 including the power strip.

DETAILED DESCRIPTION OF THE INVENTION

Figure 1:
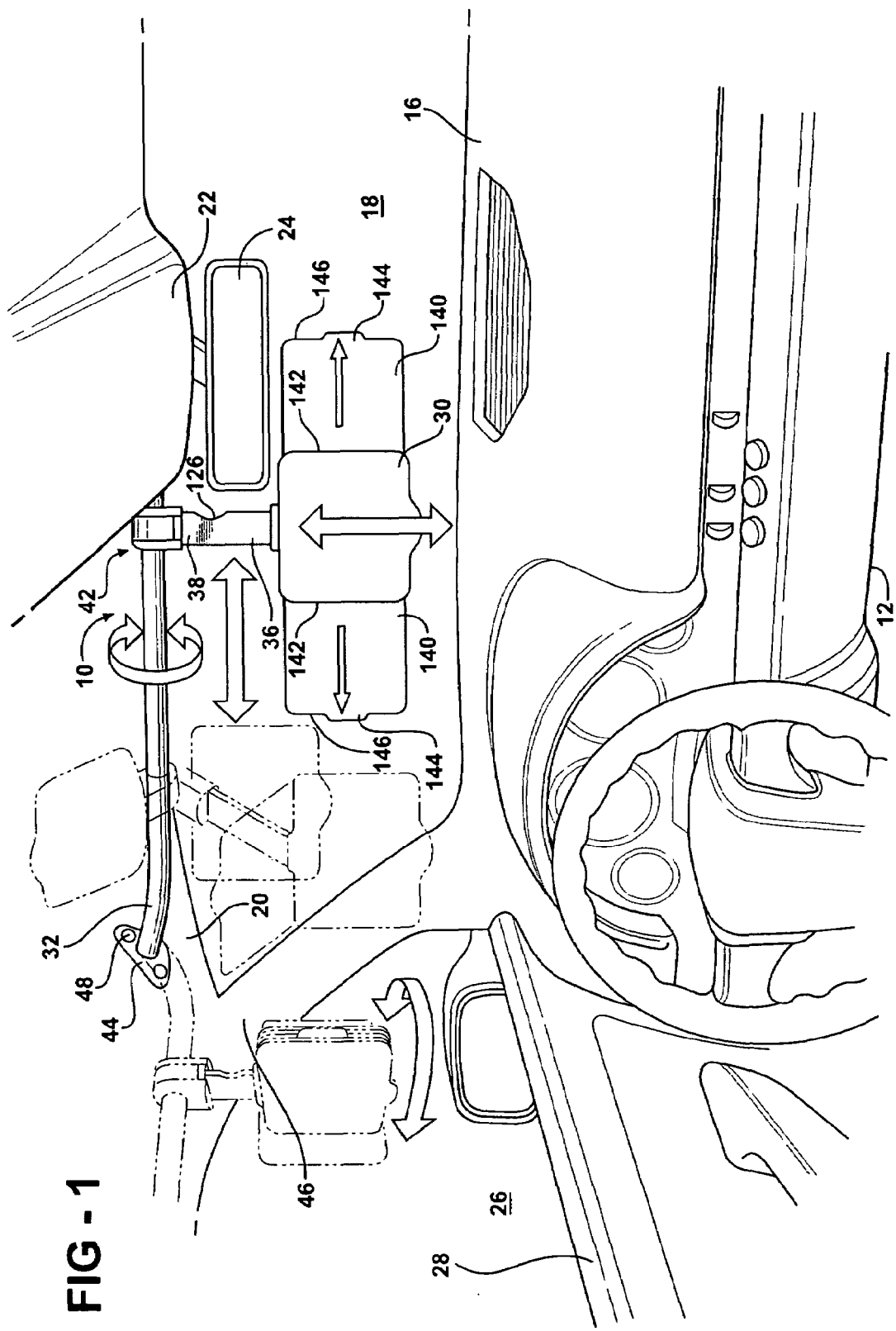
FIG. 1 is a front environmental view of a first embodiment of the visor assembly for a vehicle of the present invention illustrating various positions of the assembly relative to a windshield of the vehicle.

Referring to the Figures, wherein like numerals are used to designate like structures, a visor 30 assembly is shown generally at 10 in FIG. 1. The visor 30 assembly 10 may be employed in a vehicle 12. It should be appreciated by those having ordinary skill in the related art that the assembly 10 can be employed with any type of vehicle 12 such as, but not limited to, a transportation or construction vehicle 12. It should also be appreciated that the assembly 10 can be employed with any type of transportation vehicle 12 such as, but not limited to, a bus, car, golf cart, sport-utility vehicle 12, truck, or van. It should also be appreciated that the assembly 10 can be employed with any type of construction vehicle 12 such as, but not limited to, a bulldozer or tractor. For purposes of description only, and not by way of limitation, the assembly 10 will be described and illustrated in connection with an automobile.

As shown in FIG. 1, a typical automobile with which the assembly 10 can be used includes an interior passenger compartment having a dashboard 16 extending from one side to the other side of the interior passenger compartment. Also, a windshield 18 is located directly and immediately above the dashboard 16 and extends from one side to the other side of the interior passenger compartment. Furthermore, the automobile includes a headliner 20 located above the windshield 18, and may include an overhead console 22 mounted to the headliner 20 and located directly and immediately above a transverse centerline of the windshield 18. In addition, the automobile also includes a rearview-mirror 24 attached to the windshield 18 adjacent to the headliner 20. Moreover, the automobile includes a pair of side windows 26 (only one shown) of corresponding doors 28 (only one shown). Although a pair of the assemblies 10 may be adapted to be used in connection with corresponding halves of the symmetrical windshield 18, the assembly 10 is described below and shown in the Figures used in connection with only half of the windshield 18, i.e., the half shown in FIG. 1.

In general and as shown in FIG. 1, the assembly 10 includes a visor 30, a beam 32 that defines a first path, an arm 36 having a first end 38 and a second end 40 spaced from the first end 38, and a carrier 42 that supports the arm 36 at the first end 38. The arm 36 moveably supports the visor 30 with the visor 30 moveable between the first end 38 and the second end 40 of the arm 36. The carrier 42 connects the beam 32 and the arm 36, with the second end 40 of the arm 36 laterally spaced from the first path. Through the configuration of the visor 30, beam 32, arm 36, and carrier 42, the visor 30 is adapted to be manually continuously adjustable in a substantially horizontal, vertical, and angular manner (as represented in FIG. 1) such that the visor 30 can cover a predetermined area of the windshield 18 or a corresponding side window 26 to shade the eyes of an occupant of the vehicle 12.

The beam 32 is typically fastened above the windshield 18 within the interior passenger compartment. While the beam 32 is typically linear in shape, with the first path correspondingly linear, the beam 32 may be curved, thereby defining the first path in a winding or curved shape. For example, the beam 32 may extend across the headliner 20 above the windshield 18 and continuously extend above one of the side windows 26.

As shown in FIGS. 1 and 7, the assembly 10 further includes a connection member 44 for fastening the beam 32 to the headliner 20. As best shown in FIG. 7, the connection member 44 may be pivotally mounted to an end of the beam 32 for connecting the beam 32 to the vehicle 12, in which case the beam 32 is typically substantially linear in shape. The connection member 44 is typically attached to the headliner 20 adjacent a front pillar 46 of the vehicle 12 such that the beam 32 is pivotable between a position above the windshield 18 and a position above the adjacent side window 26. Any type of fastener 48, such as a screw, can be used to fasten the connection member 44 to the headliner 20. It should be appreciated by those having ordinary skill in the related art that the connection member 44 can have any suitable shape, size, and structure and structural relationship with the interior passenger compartment and beam 32. It should also be so appreciated that the beam 32 can pivot by any known mechanism.

Referring again to FIG. 7, the beam 32 may further include a clip lock 50. More specifically, the clip lock 50 may be disposed at an opposite end of the beam 32 from the connection member 44. The clip lock 50 allows the occupant of the vehicle 12 to manually lock the beam 32 into position and release it therefrom such that the beam 32 can pivot about the connection member 44. The shape of the clip lock 50 may be designed to minimize or prevent injury to an eye of the occupant when he or she swings the beam 32 back and forth between the windshield 18 and respective side window 26. While FIG. 7 shows one configuration of the clip lock 50, it is to be appreciated that the instant invention is not limited to a particular shape or configuration of the clip lock 50. It should also be appreciated that the beam 32 can be locked into position and released therefrom by any suitable mechanism.

The assembly 10 may further include a station 52, also mounted to the headliner 20, into which the clip lock 50 can be mechanically connected or parked for releasably manually locking the beam 32 into position. As shown in FIG. 7, the clip lock 50 may have a release button 54, wherein the occupant may manually release the beam 32 from the station 52 by depressing the button. The station 52 can also act to provide a power or battery-charging connection into which the clip lock 50 can be electrically connected or parked for powering or charging a battery (not shown) that supplies power to electrical devices, such as a source of light 56, that may be included in the visor 30.

Figure 3:
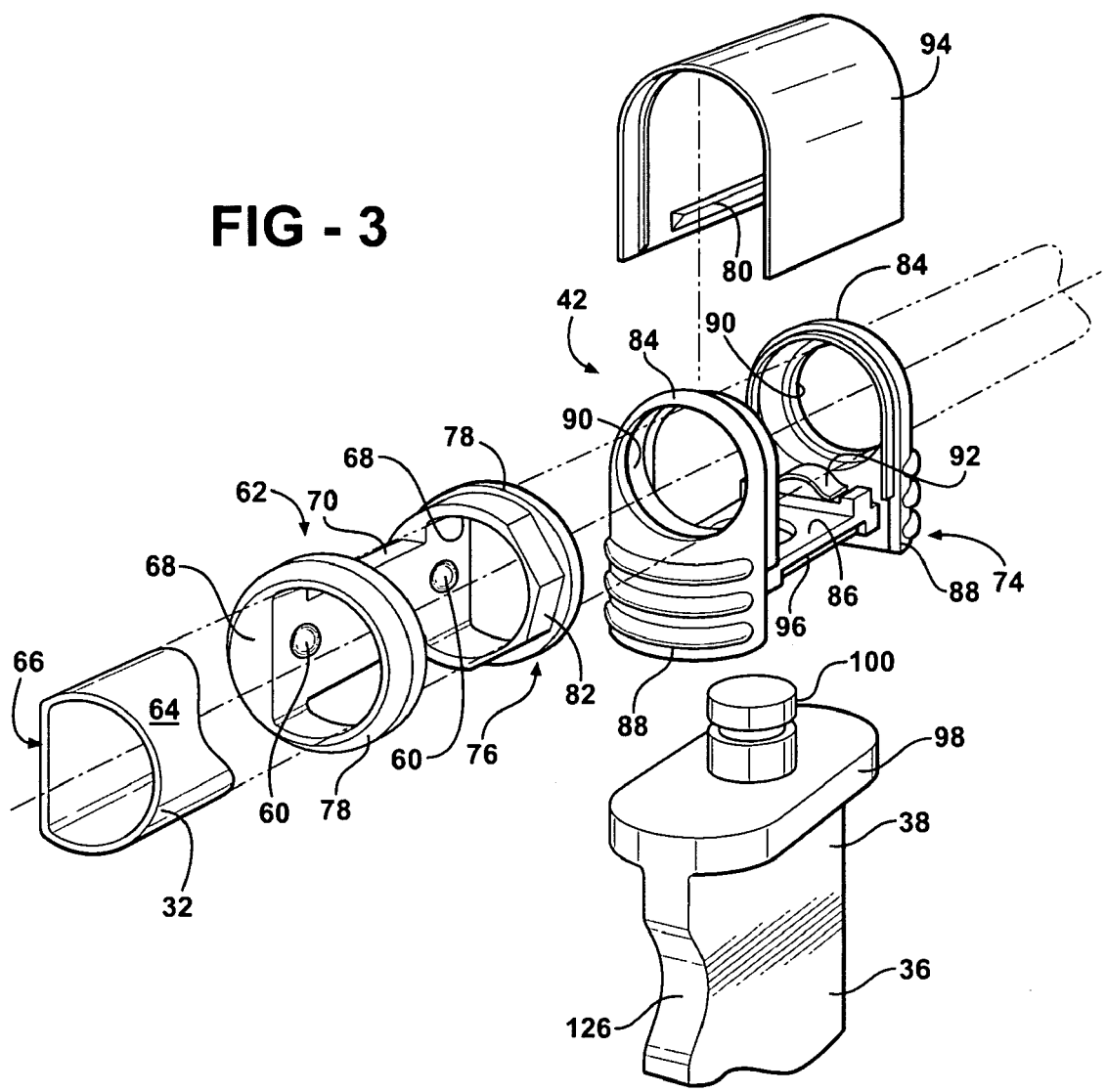
FIG. 3 is a fragmentary exploded view of the rotator and slider, with a partial view of the arm and beam of the embodiment of the visor assembly for a vehicle shown in FIG. 1 illustrating connection of these elements relative to each other.
Figure 4:
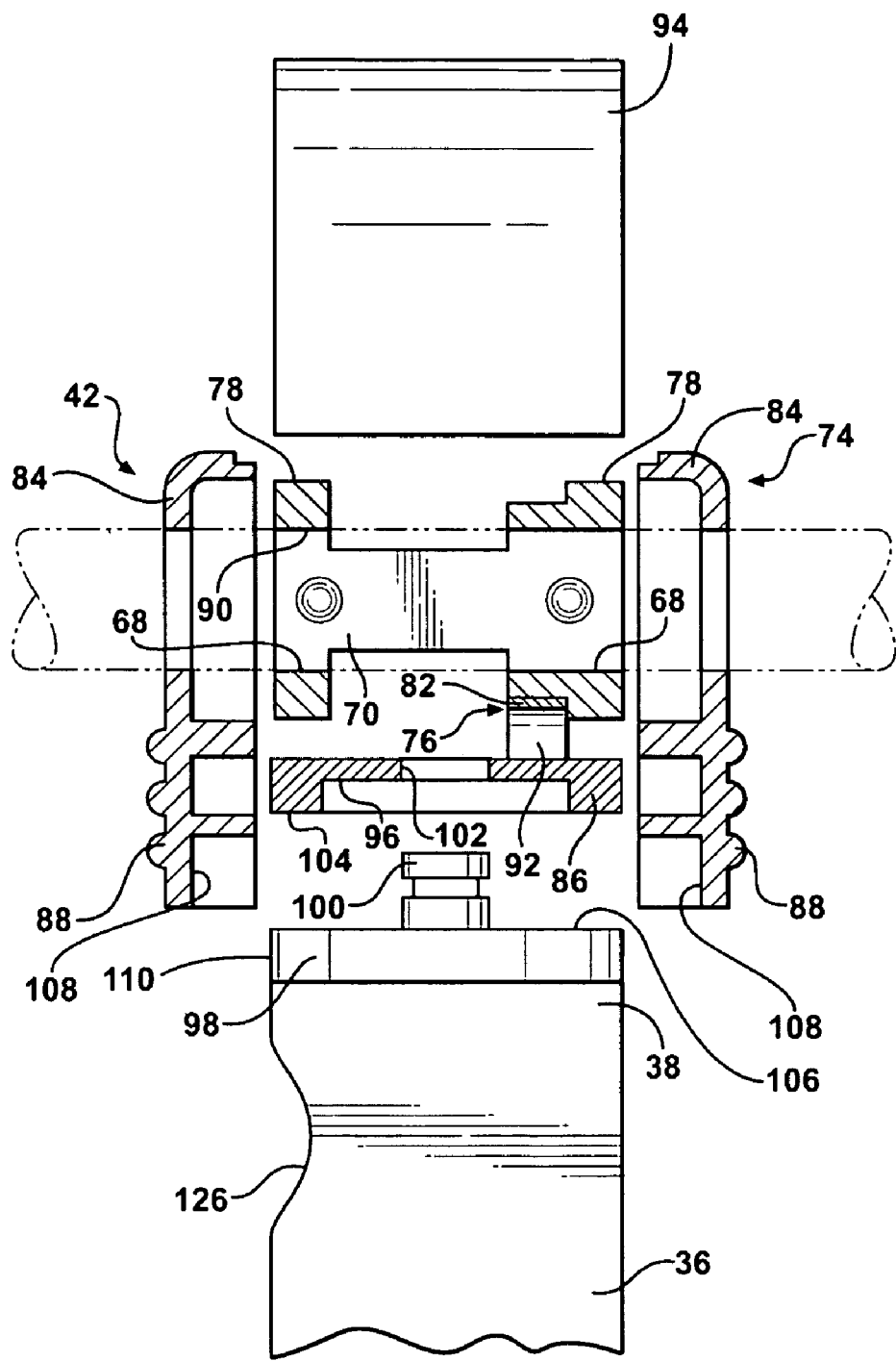
FIG. 4 is an exploded cross-sectional side view of the rotator and slider, with a partial view of the arm and beam of the embodiment of the visor assembly for a vehicle shown in FIG. 1.

The beam 32 may further include a power strip 58. In one embodiment, the power strip 58 may extend along the first path of the beam 32, between the connection member 44 and clip lock 50. The power strip 58 is typically adapted to provide electrical communication between the power or battery-charging connection located within the station 52 and any electrical device in the visor 30. In one embodiment, as shown in FIGS. 3 and 4, the carrier 42 may include a power contact 60 adapted to be in electrical communication with the power strip 58 to constantly power the electrical device in the visor 30.

Figure 2:
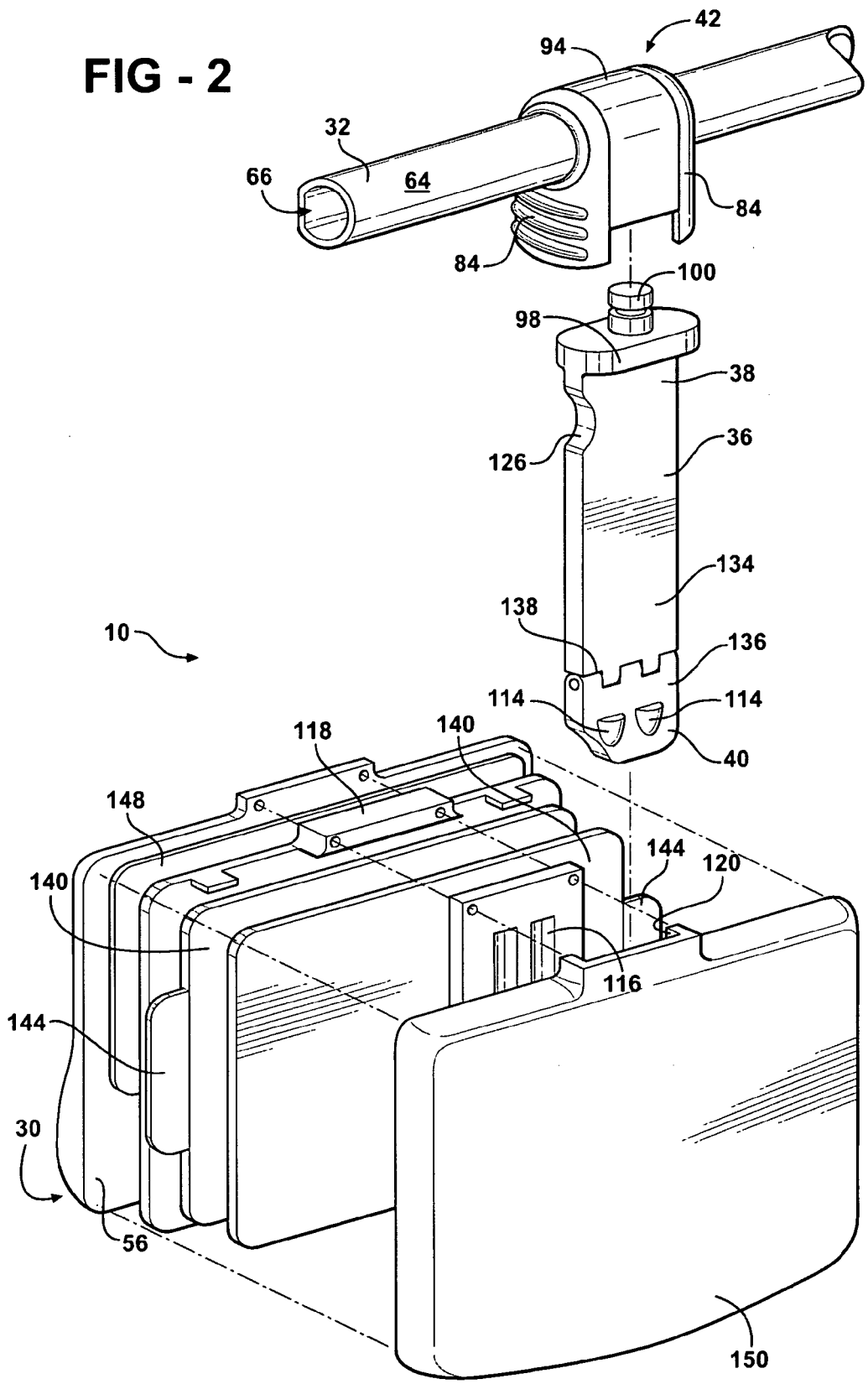
FIG. 2 is a fragmentary exploded view of the visor, arm, rotator, slider, and beam of the embodiment of the visor assembly for a vehicle shown in FIG. 1 illustrating connection of these elements relative to each other.

As set forth above, the assembly 10 further includes the carrier 42. The carrier 42 is moveable along the first path of the beam 32. In one embodiment (not shown), the beam 32 is telescopically extendable along the first path, with the carrier 42 fixed to the beam 32 such that the carrier 42 moves along the first path. Alternatively, the carrier 42 and the beam 32 are slidably engaged. In this embodiment, the carrier 42 includes a slider 62 that is typically confined to linear movement along the beam 32. To confine the movement of the slider 62 to linear movement, the beam 32 may have a non-symmetrical cross-section, and the slider 62 may matingly engage the beam 32. For example, as shown in FIGS. 2 and 3, the cross-section of the beam 32 may have a substantially cylindrical shape 64 but with the cylindrical shape 64 having a flattened side 66 typically running the entire length of the beam 32. Location of the flattened side 66 on the beam 32 may be adjusted based upon aesthetics and an ability of the slider 62 to slide from side to side on the beam 32 with proper tensioning during operation of the vehicle 12.

The flattened side 66 of the beam 32 effectively prevents the slider 62 from rotating about the beam 32. More specifically, the slider 62 may include a hollow and doubly open-ended shape 68 having a cross-section corresponding to that of the beam 32, with the open-ended shape 68 adapted to slide along the beam 32. The non-symmetrical cross-section of the beam 32, and corresponding shape of the doubly open-ended shape 68, prevents the slider 62 from rotating about the first path and confines the slider 62 to linear movement, which provides mechanical integrity to the assembly 10 and contributes to controllability of the position of the visor 30. The doubly open-ended shape 68 may also include the power contact 60 described above, and the power contact 60 may be in the form of at least one riding bump 60 or ridge (not shown) on the portion corresponding to the flattened side 66 of the beam 32. The power contact 60 may perform the additional function of contributing to smooth sliding of the slider 62 relative to the beam 32. The power contact 60 is typically adapted to be in electrical communication with the power strip 58 on the beam 32 such that the power contact 60 may be in constant contact with the power strip 58 on the beam 32 regardless of the position of the slider 62 along the beam 32.

The carrier 42 further includes a rotator 74. The rotator 74 pivotally engages the slider 62, with the rotator 74 pivotable about the first path. The slider 62 is adapted to provide a platform for the rotator 74. Typically, a second tension mechanism 76 is disposed between the rotator 74 and the slider 62. The second tension mechanism 76 may include elements on both the slider 62 and the rotator 74. In one embodiment, the second tension mechanism 76 includes a pair of contact surfaces 78 on the slider 62 spaced from each other, with a central portion 70 of the slider 62 disposed between the respective contact surfaces 78. The contact surfaces 78 typically define a cylindrical path to allow for controlled rotational movement of the rotator 74 relative to the slider 62, as described in further detail below. A rotation-and-detent surface 82 may be defined between the central portion 70 and at least one of the contact surfaces 78. In this embodiment, the rotator 74 may include opposed end caps 84 and a base member 86 that extends from and between lower portions 88 of the end caps 84. The end caps 84 are spaced from each other and define a respective pair of holes 90 that are adapted to receive the respective contact surfaces 78 of the slider 62. To this end, the contact surfaces 78 of the slider 62 are received within the corresponding holes 90 of the respective end caps 84 and function to guide rotational movement of the rotator 74 relative to the slider 62. As shown in FIGS. 3 and 4, the base member 86 may include a tension spring 92, such as a leaf spring, disposed adjacent to at least one of the holes 90 and positioned to physically contact the respective rotation-and-detent surface 82 on the slider 62 such that the rotator 74 can rotate as much as 360° about the slider 62, with the interaction between the rotation-and-detent surface 82 and the tension spring 92 providing a biasing force to maintain the rotator 74 in a desired position relative to the slider 62. Of course, it is to be appreciated that other tension mechanisms may be employed between the slider 62 and the rotator 74, and the tension mechanism set forth above is one example of such a mechanism. Additionally, the rotator 74 may further include a rotator cap 94 disposed over the slider 62 and between and secured to the end caps 84, thereby locking the end caps 84 together. Further, the base member 86 may include a retaining edge 96 adapted to receive a locking tab 80 on the rotator cap 94 to thereby lock the rotator cap 94 in place.

As set forth above, the carrier 42 supports the arm 36 at the first end 38. In one embodiment, the carrier 42 rotatably supports the arm 36 with the arm 36 rotatable about an axis that is substantially perpendicular to the first path. More specifically, in this embodiment and as shown in FIGS. 1, 2, 3, and 6, the first end 38 of the arm 36 is connected to the rotator 74. The arm 36 may include an attachment plate 98 at the first end 38 thereof, with an arm fastener 100, such as a dowel, extending from a surface 106 of the attachment plate 98. The base member 86 may define a mounting hole 102 adapted to receive the arm fastener 100. For ease of assembly, as shown in FIG. 4, the arm fastener 100 may be adapted to receive a locking pin (not shown) once inserted through the mounting hole 102 in the base member 86 to prevent movement of the arm fastener 100 back through the mounting hole 102. A bottom surface 104 of the base member 86, on an opposite side of the base member 86 from the slider 62, may be adapted to abut the surface 106 of the attachment plate 98 such that the arm 36 is fastened to the rotator 74 with the attachment plate 98 abutting the base member 86. Moreover, the end caps 84 may include guide portions 108 that extend beyond the base plate, on an opposite side of the base plate from the holes 90. The guide portions 108 may matingly correspond to a perimeter 110 of the attachment plate 98 and may thereby guide rotation of the arm 36 relative to the carrier 42 by contacting the perimeter 110 of the attachment plate 98.

As set forth above, the visor 30 is moveable between the first end 38 and the second end 40 of the arm 36. In one embodiment (not shown), the visor 30 may be pivotally attached to the second end 40 of the arm 36. In this embodiment, the visor 30 may be extended or retracted along the arm 36 and relative to the carrier 42 by rotating the visor 30 about the pivot (not shown). Alternatively, in another embodiment, the visor 30 and the arm 36 are slidably engaged. In this embodiment, the visor 30 may include a sleeve 112 with the arm 36 and the visor 30 slidably engaged through the sleeve 112 for movement along a second path defined by the arm 36. The second path is typically substantially linear; however, the second path may be curved depending upon the shape of the arm 36 and the interaction between the arm 36 and the sleeve 112. Further, it should be appreciated that other mechanisms may be available for enabling the visor 30 to slidably engage the arm 36.

In one embodiment (not shown), the arm 36 may be relatively cylindrical in shape, with the sleeve 112 having a corresponding cylindrical shape thereby allowing the visor 30 to rotate about the arm 36. In another embodiment, as shown in FIGS. 1-3, 5A-5C, and 6, the arm 36 is substantially bladelike. The arm 36 may include a tracking bump 114, typically a pair of tracking bumps 114, disposed adjacent to the second end 40. When the arm 36 includes the tracking bump 114, the visor 30 defines a groove 116 along the second path in the sleeve 112 for receiving the tracking bump 114. In this manner, the interaction between the tracking bump 114 and the respective groove 116 maintains robust alignment of the arm 36 through the sleeve 112 during the relative movement thereof. Additionally, in this embodiment, a locking cap 118 may be disposed adjacent an insertion point 120 of said arm 36 into said sleeve 112. The locking cap 118 may be disposed across the groove 116 for contacting the tracking bump 114 and obstructing movement of the arm 36 out of said sleeve 112. Typically, the locking cap 118 is integrally disposed on the visor 30, as shown in FIG. 2.

A sufficient magnitude of force in the form of friction acting between the arm 36 and the sleeve 112 can be sufficient to prevent unrestricted movement of the arm 36 through the sleeve 112 and to hold the visor 30 in the retracted and extended position along the arm 36. However, a first tension mechanism 122 may be disposed between the arm 36 and the sleeve 112. For example, the first tension mechanism 122 may include, but is not limited to, a second tension spring 124, such as a leaf spring, or flexible "bumper" (not shown), which can be used for specific and consistent controlled tension between the arm 36 and the sleeve 112. In one embodiment, as best shown in FIGS. 2 and 5A-5C, the arm 36 may have at least one detent 126 defined along an edge thereof that is adapted to interact with the second tension spring 124 or bumper. The detent 126 may be located at a position along the arm 36 where it may be desirable to retain the visor 30 during normal usage, such as in a fully extended or fully retracted position along the arm 36.

Figure 6A:
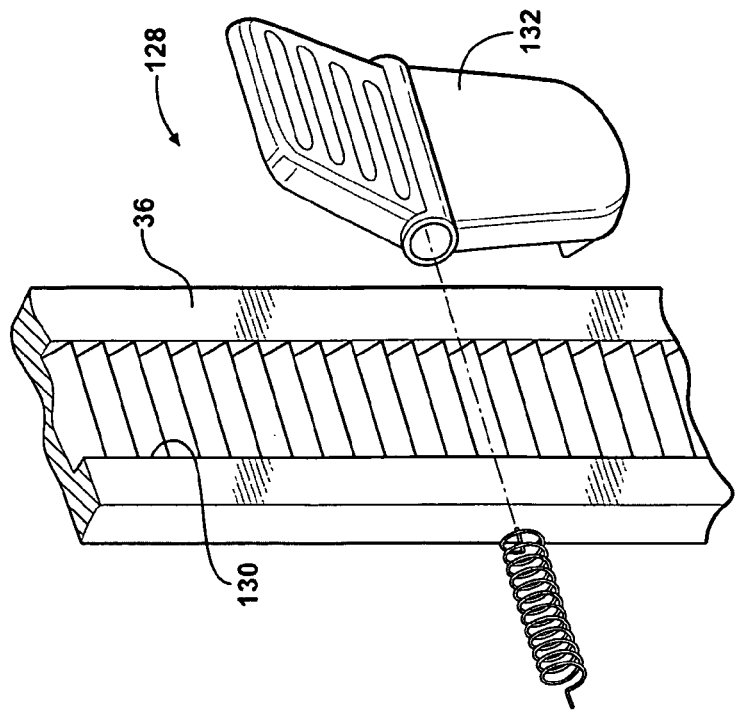
FIG. 6A is a partial perspective view of the clip-and-locking-track mechanism illustrated in FIG. 6.
Figure 6:
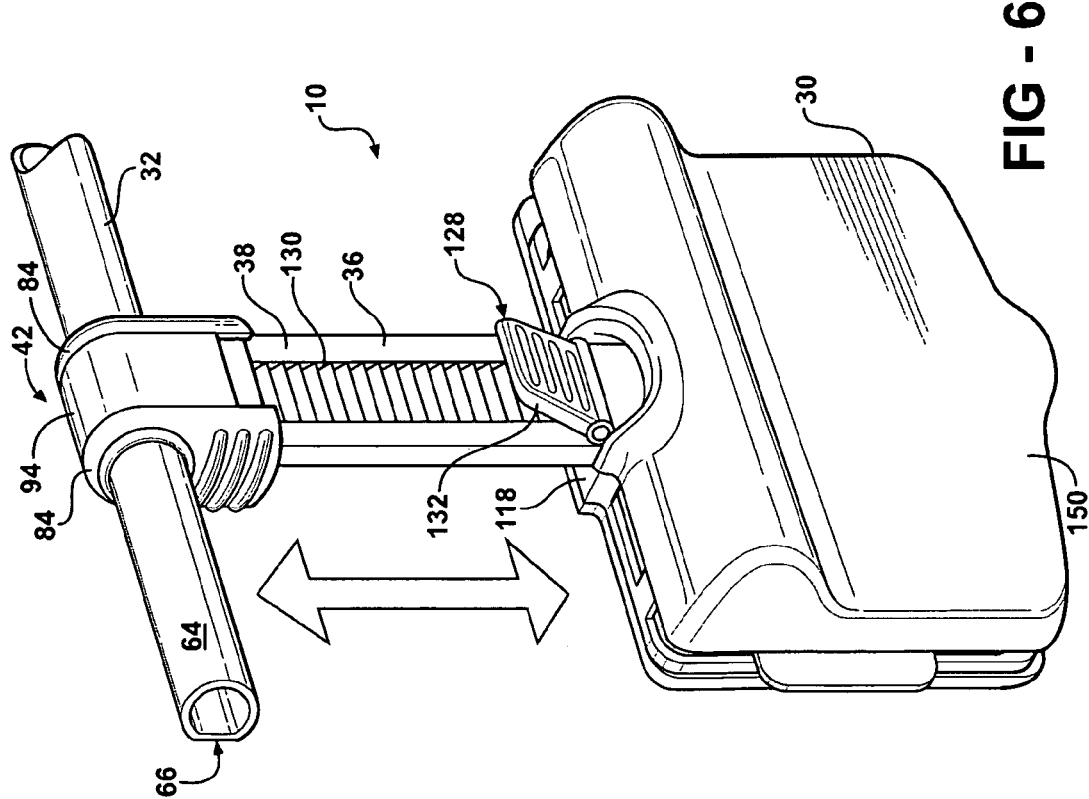
FIG. 6 is a perspective view of another embodiment of the visor assembly for a vehicle illustrating a clip-and-locking-track mechanism disposed between the arm and the visor.

As shown in FIGS. 6 and 6A, a clip-and-locking-track mechanism 128 may be used to control the position of the visor 30 along the arm 36. In this embodiment, the arm 36 has a locking track 130, and a clip 132 is disposed on the visor 30 adjacent to the insertion point 120 of the arm 36 into the sleeve 112. In this manner, the clip 132 is adapted to releasably engage the locking track 130 on the arm 36 and allow adjustment of the visor 30 along the arm 36 and, correspondingly, along the locking track 130 upon release of the clip 132 from the locking track 130 to change the desired position of the visor 30 along the arm 36.

Figure 5C:
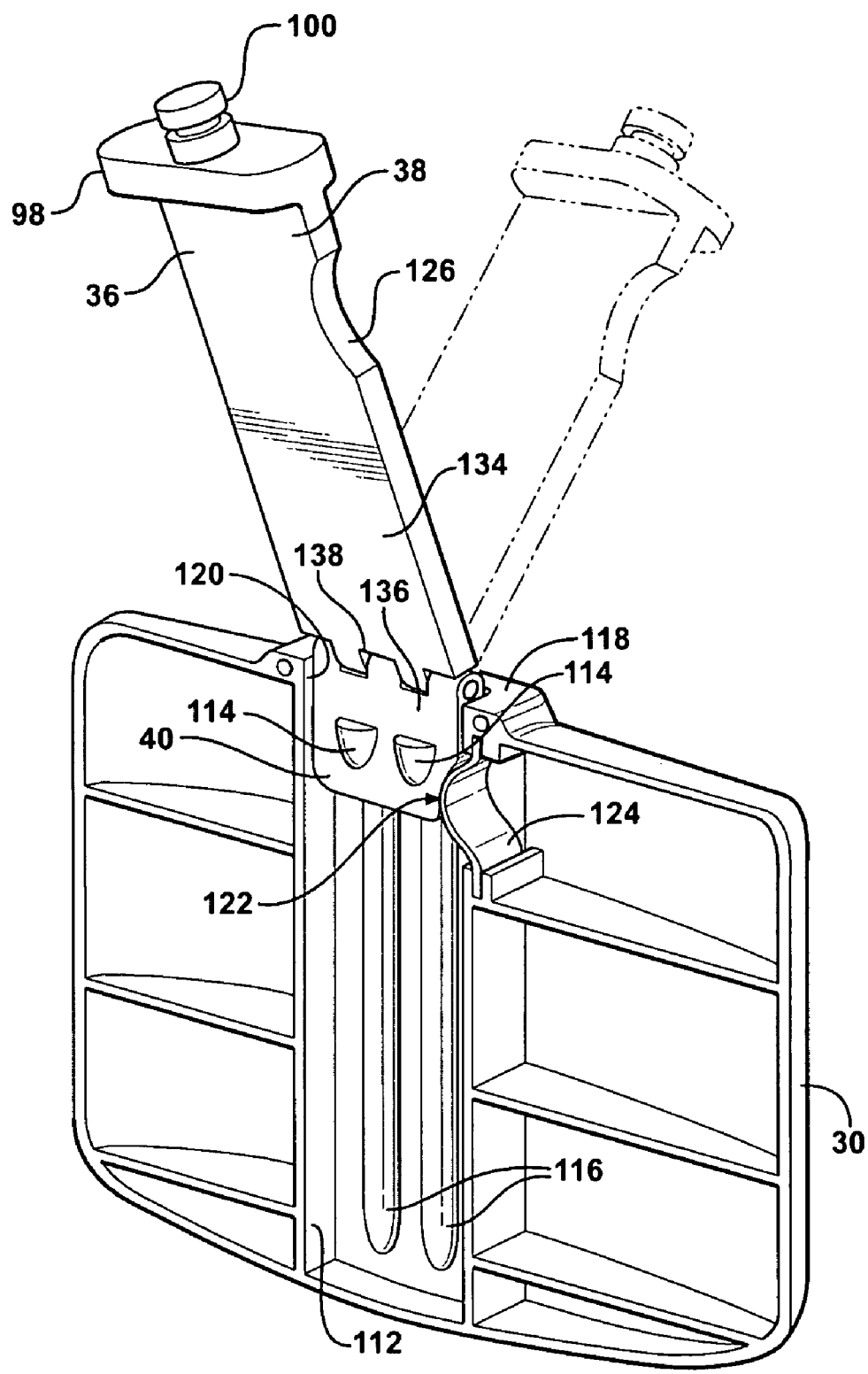
FIG. 5C is a perspective view of the visor and arm shown in FIG. 5A with the arm in a fully extended position.

The arm 36 may include a first portion 134 and a second portion 136 separated by a hinge 138 to enable fore and aft movement of the visor 30 relative to the beam 32. As best shown in FIGS. 5A-5C, the hinge 138 may be disposed closer to the second end 40 of the arm 36, where relative movement of the first portion 134 and the second portion 136 attributable to the hinge 138 is most useful due to the fact that the visor 30 is further from the carrier 42 when moved to the second end 40 of the arm 36 and, thus, movement at the rotator 74 may not allow for sufficient adjustability of the visor 30. In the embodiment shown in FIGS. 5A-5C, the pair of tracking bumps 114 on the arm 36, the respective groove 116s, the locking cap 118, the detent 126 adjacent the second end 40, and the second tension spring 124 act in conjunction to maintain the visor 30 in the fully extended position, with the tracking bumps 114 preventing further extension of the visor 30 on the arm 36 and the action of the detent 126/second tension spring 124 maintaining the visor 30 in position along the arm 36 to allow for pivotal movement of the visor 30 about the hinge 138.

As shown in FIGS. 1 and 2, the visor 30 may include a shield 140 connectingly extendable from a side 142 of the visor 30 to supplement the effective size and coverage area of the visor 30 and to shade the eyes of the occupant. For example, the shield 140 may be housed within the visor 30 and adapted to be slidably extended from the visor 30. Use of the shield 140 can substantially increase the size of the visor 30 such that it blocks unwanted sunlight resulting from, for instance, continual major displacement of the sun relative to the vehicle 12 when the vehicle 12 travels along a winding road. Due to the wide range of motion of the visor 30 that is made possible through the assembly 10 of the instant invention, the size of the visor 30 may be minimized while still effectively functioning to block sunlight and other unwanted light. In fact, the size of the visor 30 may be minimized to a point where the shield 140 may at least double a size of the visor 30. As such, the doubling of the size of the visor 30 is not so much attributable to a large size of the shield 140, but rather to a potentially relatively small size of the visor 30.

In the embodiment of the assembly 10 shown in FIGS. 1 and 2, a pair of shields 140 connectingly extend from respective sides of the visor 30. Each shield 140 may have a tab 144 extending from the end 146 of the shield 140 located distal the visor 30. The tab 144 may be adapted to be manually pulled by the occupant for continuously extending the shield 140 substantially horizontally from the visor 30. FIG. 2, in particular, shows the shields 140, with respect to the visor 30, stored and centered wherein only the tabs 144 extend from respective sides of the visor 30. A stopper may be included on the shields 140 to prevent the shields 140 from being separated from the visor 30.

The visor 30 may also include a vanity mirror 148, source of light 56 adapted to illuminate the vanity mirror 148, and mirror cover 150 adapted to cover the vanity mirror 148. It should be appreciated by those having ordinary skill in the related art that the vanity mirror 148, the source of light 56, and the mirror cover 150 can have any suitable shape, size, and structure and structural relationship with each other. It should also be appreciated by those having ordinary skill in the related art that the source of light 56 can be any suitable source, such as a plurality of light bulbs. It should also be so appreciated that the source of light 56 can be powered by any suitable power source, and electricity may be provided to the source of light 56 through mechanisms including the power strip 58 and power contact 60 system described above. It should also be so appreciated that a battery (not shown) or rechargeable system (not shown) can be employed, and the battery or rechargeable system may be used to power other electronic devices in the visor 30, such as a garage-door opener (not shown).

In general operation of the assembly 10 shown in FIG. 1, the occupant is seated within the interior passenger compartment directly and immediately in front of the dashboard 16 such that the occupant's eyes look into the windshield 18. To shade the eyes, the occupant may horizontally adjust the visor 30 to align it horizontally in front of them by manually pushing or pulling the visor 30 to the right or left. As described above, the visor 30 may slide via the slider 62, which horizontally rides along the beam 32, which, in turn, may be pivotal about the connection member 44 for when the occupant desires to shade the eyes from light entering the interior passenger compartment through the side window(s) 26. The occupant may then vertically adjust the visor 30 to align it vertically in front of the eyes by manually pushing or pulling the visor 30 upward or downward along the arm 36. The arm 36 may be received by the sleeve 112 in the visor 30 and held in position in the visor 30 through friction fit or by the first tension mechanism 122, which may include the leaf spring 124 or bumper, or by the clip-and-locking-track mechanism 128. The second tension mechanism 76, disposed between the slider 62 and the rotator 74s, maintains angular positioning of the arm 36 relative to the beam 32. Of course, the occupant can use the vanity mirror 148 and/or the shields 140.

The assembly 10 enables the visor 30 to be relatively small, yet capable of blocking the sun and other sources of light without causing undue impairment or obstruction of vision of the occupant of the vehicle 12 around the assembly 10 such that peripheral vision of the occupant relative to the visor 30 is not impaired or obstructed. Also, the assembly 10 may include the optional vanity mirror 148 and the source of light 56 and can be maximally articulated such that the visor 30 can be specifically positioned for optimal use of the optional vanity mirror 148 and source of light 56 and blocking of the sun, unwanted headlight glare of an oncoming vehicle 12, or light glare off other vehicle 12s that the vehicle 12 is following. And, the visor 30 can be stored out of view and quickly manually continuously adjustable in an "infinite" number of positions in a substantially horizontal, vertical, and angular manner. Furthermore, the effective length of the visor 30 can optionally be adjusted and increased through extension of the optional shields 140. In addition, the assembly 10 is non-handed and can be fitted to either the driver or passenger side of the vehicle 12 without any changes required to be made to the assembly 10, and the assembly 10 does not require any unique attachment to the interior passenger compartment and can replace existing "rod type" vehicle 12 sun visor 30s with changes made to the vehicle 12 being substantially unnecessary.

The invention has been described in an illustrative manner, and it is to be appreciated that the terminology which has been used is intended to be in the nature of words of description rather than of limitation. Obviously, many modifications and variations of the present invention are possible in view of the above teachings. It is, therefore, to be appreciated that within the scope of the claims the invention may be practiced otherwise than as specifically described, and that the reference numerals are merely for convenience and are not to be in any way limiting.

What is claimed is:

1. A visor assembly for a vehicle comprising:
  a visor comprising a sleeve;
  a beam defining a first path;
  an arm having a first end and a second end spaced from said first end, said arm moveably supporting said visor with said visor moveable between said first end and said second end; and
  a carrier supporting said arm at said first end and connecting said beam and said arm with said second end laterally spaced from said first path, said carrier moveable along said first path;
  wherein said arm and said visor are slidably engaged through said sleeve for movement along a second path.

2. A visor assembly as set forth in claim 1 wherein said arm comprises a tracking bump disposed adjacent said second end.

3. A visor assembly as set forth in claim 2 wherein said visor defines a groove along said second path in said sleeve for receiving said bump.

4. A visor assembly as set forth in claim 3 further comprising a locking cap disposed adjacent an insertion point of said arm into said sleeve, said locking cap disposed across said groove for contacting said bump and obstructing movement of said arm out of said sleeve.

5. A visor assembly as set forth in claim 1 wherein said arm comprises a first portion and a second portion separated by a hinge.

6. A visor assembly as set forth in claim 1 further comprising a first tension mechanism disposed between said arm and said sleeve.

7. A visor assembly as set forth in claim 1 wherein said carrier rotatably supports said arm with said arm rotatable about an axis substantially perpendicular to said first path.

8. A visor assembly as set forth in claim 1 wherein said carrier and said beam are slidably engaged.

9. A visor assembly as set forth in claim 8 wherein said carrier comprises a slider confined to linear movement along said beam.

10. A visor assembly as set forth in claim 9 wherein said carrier further comprises a rotator pivotally engaging said slider with said rotator pivotable about said first path.

11. A visor assembly as set forth in claim 10 further comprising a second tension mechanism disposed between said rotator and said slider.

12. A visor assembly as set forth in claim 1 wherein said visor comprises a shield connectingly extendable from a side of said visor, wherein said shield at least doubles a size of said visor.

13. A visor assembly for a vehicle comprising:
  a visor;
  a beam defining a first path;
  a connection member pivotally mounted to an end of said beam for connecting said beam to the vehicle;
  an arm having a first end and a second end spaced from said first end, said arm moveably supporting said visor with said visor moveable between said first end and said second end; and
  a carrier supporting said arm at said first end and connecting said beam and said arm with said second end laterally spaced from said first path, said carrier moveable along said first path.

14. A visor assembly as set forth in claim 13 wherein said beam further comprises a clip lock disposed at an opposite end of said beam from said connection member.

15. A visor assembly as set forth in claim 14 further comprising a station mechanically connectable to said clip lock.

16. A visor assembly as set forth in claim 1 wherein said beam further comprises a power strip extending along said first path.

17. A visor assembly for a vehicle comprising:
  a visor comprising a shield connectingly extendable from a side of said visor, wherein said shield at least doubles a size of said visor;
  a beam defining a first path;
  an arm having a first end and a second end spaced from said first end, said arm moveably supporting said visor with said visor moveable between said first end and said second end; and
  a carrier supporting said arm at said first end and connecting said beam and said arm with said second end laterally spaced from said first path, said carrier moveable along said first path.

18. A visor assembly as set forth in claim 17 wherein said visor and said arm are slidably engaged.

19. A visor assembly as set forth in claim 18 wherein said visor comprises a sleeve with said arm and said visor slidably engaged through said sleeve for movement along a second path.

20. A visor assembly for a vehicle comprising:

a visor;

a beam defining a first path and comprising a power strip extending along said first path;

an arm having a first end and a second end spaced from said first end, said arm moveably supporting said visor with said visor moveable between said first end and said second end; and a carrier supporting said arm at said first end and connecting said beam and said arm with said second end laterally spaced from said first path, said carrier moveable along said first path.

* * * * *

UNITED STATES PATENT AND TRADEMARK OFFICE
CERTIFICATE OF CORRECTION

PATENT NO. : 7,537,263 B2  Page 1 of 1
APPLICATION NO. : 11/873994
DATED : May 26, 2009
INVENTOR(S) : John B. Delphia It is certified that error appears in the above-identified patent and that said Letters Patent is hereby corrected as shown below:

Column 9, Line 52 Claim 1

Please delete "compnsing" and insert --comprising--.

Signed and Sealed this

Eleventh Day of August, 2009

David J. Kappos
*Director of the United States Patent and Trademark Office*